United States Patent
Czapka et al.

(10) Patent No.: US 10,660,257 B2
(45) Date of Patent: May 26, 2020

(54) SYSTEM AND METHOD FOR AUTOMATICALLY ACTUATING WING ASSEMBLIES OF AN AGRICULTURAL IMPLEMENT

(71) Applicant: CNH Industrial America, LLC, New Holland, PA (US)

(72) Inventors: Jason T. Czapka, Munster, IN (US); Kevin D. McKee, Naperville, IL (US); Kevin M. Smith, Narvon, PA (US); Robert J. Longua, Palatine, IL (US); Keith W. Wendte, Willowbrook, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 285 days.

(21) Appl. No.: 15/794,126

(22) Filed: Oct. 26, 2017

(65) Prior Publication Data

US 2019/0124822 A1    May 2, 2019

(51) Int. Cl.
*A01B 73/06* (2006.01)
*A01B 76/00* (2006.01)

(52) U.S. Cl.
CPC .......... *A01B 73/067* (2013.01); *A01B 73/065* (2013.01); *A01B 76/00* (2013.01)

(58) Field of Classification Search
CPC ............................. A01B 73/067; A01B 76/00
(Continued)

(56) References Cited

U.S. PATENT DOCUMENTS 4,137,852 A    2/1979 Pratt
4,320,805 A    3/1982 Winter
(Continued)

FOREIGN PATENT DOCUMENTS

EP    1175820    1/2002

OTHER PUBLICATIONS

Planter Manual John Deere "1512 FX, 1516FX & 1524FX Planter Manual" http://Manuals.deere.com Dated 2013 4 pages.
(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

In one aspect, a method for automatically actuating wing assemblies an agricultural implement associated with a work vehicle may include monitoring, with one or more computing devices, a first wing movement parameter associated with folding or unfolding a wing assembly of the agricultural implement during the performance of a wing movement operation. The method may also include determining, with the one or more computing devices, whether the first wing movement parameter satisfies a first condition associated with a first predetermined threshold value defined for the wing movement operation. The method may include, automatically initiating, with the one or more computing devices, movement of the work vehicle relative to a surface on which the work vehicle is supported to assist the folding or unfolding of the wing assembly during the performance of the wing movement operation when it is determined that the first wing movement parameter satisfies the first condition.

18 Claims, 9 Drawing Sheets

(58) Field of Classification Search
USPC .......................................................... 172/311
See application file for complete search history.

(56) References Cited

U.S. PATENT DOCUMENTS

| | | | | |
|---|---|---|---|---|
| 4,567,689 | A * | 2/1986 | Lemons | A01B 39/16 |
| | | | | 172/310 |
| 5,154,240 | A * | 10/1992 | Carrick | A01B 73/067 |
| | | | | 172/311 |
| 5,251,704 | A * | 10/1993 | Bourgault et al. | A01B 49/04 |
| | | | | 172/247 |
| 6,189,465 | B1 | 2/2001 | Burns et al. | |
| 6,220,366 | B1 * | 4/2001 | Noonan et al. | A01B 73/046 |
| | | | | 172/311 |
| 7,854,273 | B2 | 12/2010 | Friggstad et al. | |
| 7,918,285 | B1 | 4/2011 | Graham et al. | |
| 8,235,133 | B2 | 8/2012 | Friggstad | |
| 8,601,781 | B2 * | 12/2013 | Steenhoek et al. | A01D 78/144 |
| | | | | 172/311 |
| 8,833,481 | B2 | 9/2014 | Blunier et al. | |
| 8,868,303 | B2 | 10/2014 | Tuttle et al. | |
| 8,909,435 | B2 | 12/2014 | Tuttle et al. | |
| 8,928,486 | B2 | 1/2015 | Hui et al. | |
| 9,031,749 | B2 | 5/2015 | Hubalek et al. | |
| 9,226,490 | B2 | 1/2016 | Keye | |
| 9,516,798 | B2 | 12/2016 | Sudbrink et al. | |
| 9,706,701 | B2 | 7/2017 | Prickel et al. | |
| 2014/0379230 | A1 | 12/2014 | Koch et al. | |
| 2016/0212928 | A1 | 7/2016 | Wileniec et al. | |
| 2019/0014723 | A1 * | 1/2019 | Stanhope et al. | A01D 75/185 |

OTHER PUBLICATIONS

Power Fold Till Farmer "AE50 Awards Recognize New Technology in Farm Machinery" http://www.no-tillfarmer.com Dated Jan. 4, 2016 (26 pages).

* cited by examiner

SYSTEM AND METHOD FOR AUTOMATICALLY ACTUATING WING ASSEMBLIES OF AN AGRICULTURAL IMPLEMENT

FIELD OF THE INVENTION

The present subject matter relates generally to systems and methods for performing automatic wing movement operations for agricultural implements and, more particularly, to system and methods for assisting a wing movement operation by automatically controlling the movement of an associated work vehicle.

BACKGROUND OF THE INVENTION

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and reclose the soil in a single operation. To make the seeding operation as efficient as possible, very wide swaths may be covered by extending wing assemblies on either side of a center frame section of the implement being pulled by the tractor. Typically, each wing assembly includes one or more toolbars, various row units mounted on the toolbar(s), and one or more associated support wheels. The wing assemblies are commonly disposed in a "floating" arrangement during the planting operation, wherein hydraulic cylinders allow the implement to contact the soil with sufficient force to open the soil, dispense the seeds, and subsequently close the soil. For transport, the wing assemblies are elevated by the support wheels to disengage the row units from the ground and may optionally be folded, stacked, and/or pivoted to reduce the width of the implement.

To transition the wing assemblies from a transport position to a work or extended position, a wing movement operation is performed in which the assemblies are moved via control of the operation of the associated hydraulic cylinders to allow the wing assemblies to be unfolded relative to the center frame section of the implement and subsequently lowered relative to the ground. A reverse operation may be performed to transition the wing assemblies from the extended position to the transport position in which the wing assemblies are raised relative to the ground and subsequently folded towards the center frame section of the implement.

At times, folding and unfolding of the wing assemblies may be resisted or impeded, preventing full performance of the wing movement operation. For example, ground irregularities may impede or even stop the movement of the support wheels of the wing assemblies. Similarly, friction between the various joints or couplings of the wing assemblies or frame may resist the folding or unfolding movement. In response, the operator of the work vehicle may manually drive it forward or rearward to assist. However, driving the work vehicle too fast or too slow could damage the frame or hydraulic cylinders of the implement. Additionally, manually controlling the movement of the work vehicle may interrupt the automatic process of folding and unfolding the wing assembly, reduce efficiency, increase operator fatigue, and/or increase the risk of damage to the implement.

Accordingly, a system and related methods for automatically actuating wing assemblies of an agricultural implement and automatically providing assistance with the associated work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically actuating wing assemblies of an agricultural implement associated with a work vehicle. The method may include monitoring, with one or more computing devices, a first wing movement parameter associated with folding or unfolding a wing assembly of the agricultural implement during the performance of a wing movement operation. The method may also include determining, with the one or more computing devices, whether the first wing movement parameter satisfies a first condition associated with a first predetermined threshold value defined for the wing movement operation. The method may also include, when it is determined that the first wing movement parameter satisfies the first condition, automatically initiating, with the one or more computing devices, movement of the work vehicle relative to a surface on which the work vehicle is supported to assist the folding or unfolding of the wing assembly during the performance of the wing movement operation.

In another aspect, the present subject matter is directed to a system for actuating wing assemblies associated with a work vehicle. The system may comprise an agricultural implement including a frame and a wing assembly coupled to the frame. The wing assembly may be configured to be moved relative to the frame between an extended position and a transport position during the performance of a wing movement operation. The system may include a wing movement sensor configured to detect a first wing movement parameter associated with movement of the wing assembly between the extended position and the transport position. The system may also include a vehicle controller configured to control movement of the work vehicle with respect to a surface on which the work vehicle is supported. The system may also include an implement controller communicatively coupled to the wing movement sensor and the vehicle controller, and the implement controller may include a processor and associated memory. The memory may store instructions that, when executed by the processor, configure the implement controller to monitor the first wing movement parameter based on signals received from the wing movement sensor. The instructions may further configure the implement controller to determine whether the wing movement parameter satisfies a first condition with respect to a first predetermined threshold value defined for the wing movement operation. The instructions may further configure the implement controller such that when it is determined that the wing movement parameter satisfies the first condition, the implement controller automatically transmits a vehicle movement request to the vehicle controller to cause the work vehicle to move relative to a surface on which the work vehicle is supported to assist moving the wing assembly between the extended and transport positions during the wing movement operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
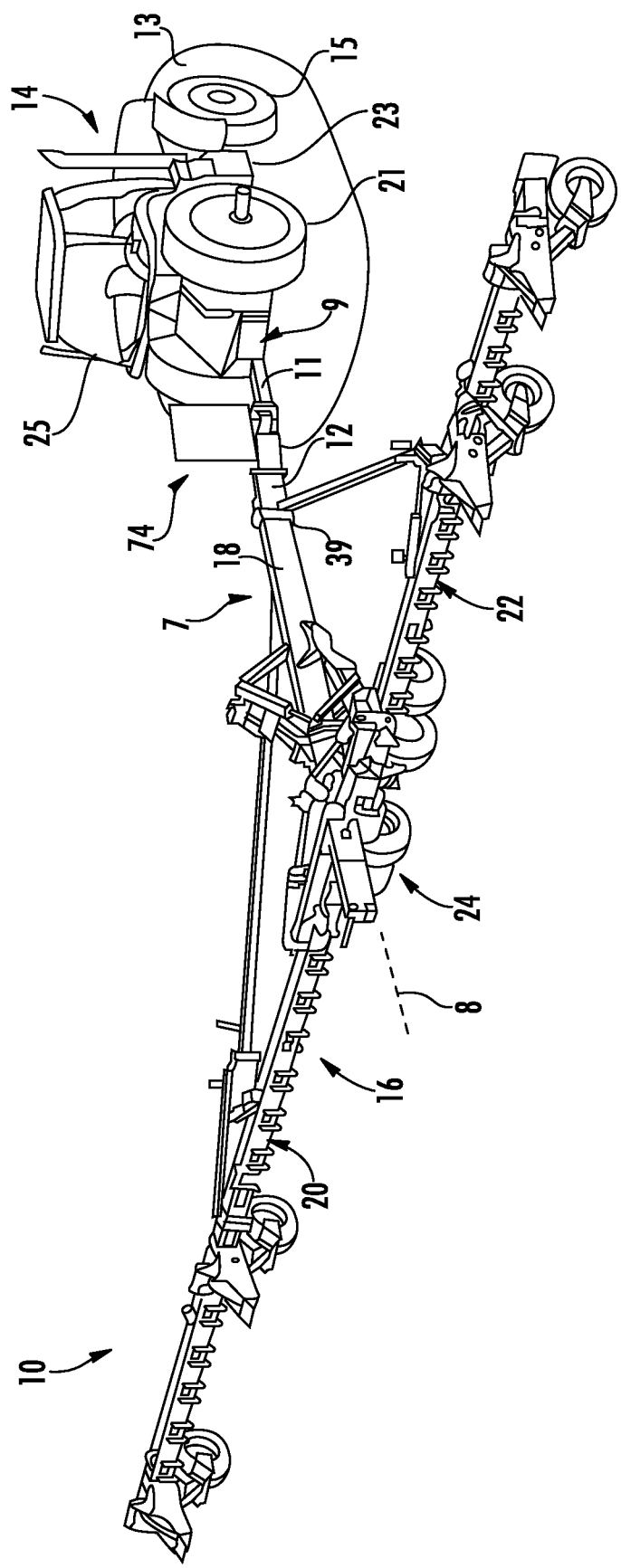
FIG. 1 illustrates a perspective view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically actuating wing assemblies of an agricultural implement and automatically providing assistance with the associated work vehicle. Specifically, in several embodiments, the implement controller may be configured to monitor a first wing movement parameter associated with folding or unfolding a wing assembly of the agricultural implement during the performance of a wing movement operation (e.g., a speed of the wing assemblies, a load applied through the frame of the implement, a pressure associated with an actuator of the implement, and/or the like). The implement controller may then determine whether the first wing movement parameter satisfies a first condition associated with a first predetermined threshold value defined for the wing movement operation. For example, the implement controller may determine whether a wing speed exceeds a predetermined threshold speed or whether the load applied through the frame exceeds a predetermined threshold load. When it is determined that the first wing movement parameter satisfies the first condition, the implement controller may automatically initiate movement of the work vehicle relative to a surface on which the work vehicle is supported to assist folding or unfolding of the wing assembly during the performance of the wing movement operation. Additionally, in some embodiments, the implement controller may continue to monitor a second wing movement parameter (e.g., a speed of the wing assemblies, a load applied through the frame of the implement, a pressure associated with an actuator of the implement, and/or the like), which may be the same as the first wing movement parameter, or different from the first wing movement parameter. In such an embodiment, the implement controller may, for example, automatically reduce the speed at which the work vehicle is being moved when it is determined that the second wing movement parameter satisfies a second condition associated with a second predetermined threshold value defined for the wing movement operation.

Referring now to the drawings, FIG. 1 illustrates a perspective view of one embodiment of a work vehicle 14 towing a planter 10 in an extended position across the ground surface 13. The work vehicle 14 includes a pair of front wheels 15 (and associated front tires), a pair of rear wheels 21 (and associated rear tires) and a frame or chassis 23 coupled to and supported by the wheels 15, 21. An operator's cab 25 may be supported by a portion of the chassis 23 and may house various input devices for permitting an operator to control the operation of one or more components of the work vehicle 14 and/or one or more components of the implement 10. Additionally, as is generally understood, the work vehicle 14 may include an engine and a transmission mounted on the chassis 23. The transmission may be operably coupled to the engine and may provide variably adjusted gear ratios for transferring engine power to the wheels 15, 21 via a drive axle assembly (or via axles if multiple drive axles are employed).

It should be appreciated that the configuration of the work vehicle 14 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle, or rely on tracks in lieu of the tires. For instance, the work vehicle may correspond to a "fully tracked" work vehicle having tracks in lieu of both of its front and rear wheels or a "half-tracked" work vehicle having tracks in lieu of front or rear wheels.

Similarly, it should also be appreciated that the configuration of the planter 10 described herein and shown in FIG. 1 is only provided for exemplary purposes. Thus, it should be appreciated that the present subject matter may be readily adaptable to any suitable manner of agricultural implement configuration.

The work vehicle 14 may include a hitch assembly 9 configured to raise and lower a hitch 11 of the implement 10 relative to the work vehicle 14 and the ground 13. Alternatively, the hitch 11 of the implement 10 may include one or more actuators configured to raise and lower the end of the implement 10 nearest the hitch 11 relative to the ground surface 13.

The planter 10 may include a frame 16 generally comprising a center frame section 7 including a central outer frame member 18 connected with a central inner frame member 12. The planter 10 may also comprise a pair of wing assemblies 20, 22 connected to the central outer frame member 18 at a central hinge assembly 24 in a manner that allows the wing assemblies 20, 22 to fold forward. Although not pictured, seed units, seed/fertilizer hoppers, cabling, and hydraulics may be mounted to the central outer member 18 and the wing assemblies 20, 22 to control the deposition of seed, fertilizer, insecticide, herbicide, and the like onto the ground surface.

As will be appreciated by one skilled in the art, the central outer member 18 may be generally aligned with the central inner frame member 12 along a central axis 8 generally extending parallel with a direction of travel of the tractor. In this regard, the left wing assembly 20 and right wing assembly 22 may be disposed on either side of the central frame members 12, 18. The wing assemblies 20, 22 may be oriented symmetrically about the central axis 8 and may be similarly constructed. As such, for purposes of description, the left-side wing assembly 20 will be described but it is understood that the right-side wing assembly 22 may be of similar construction.

Figure 2:
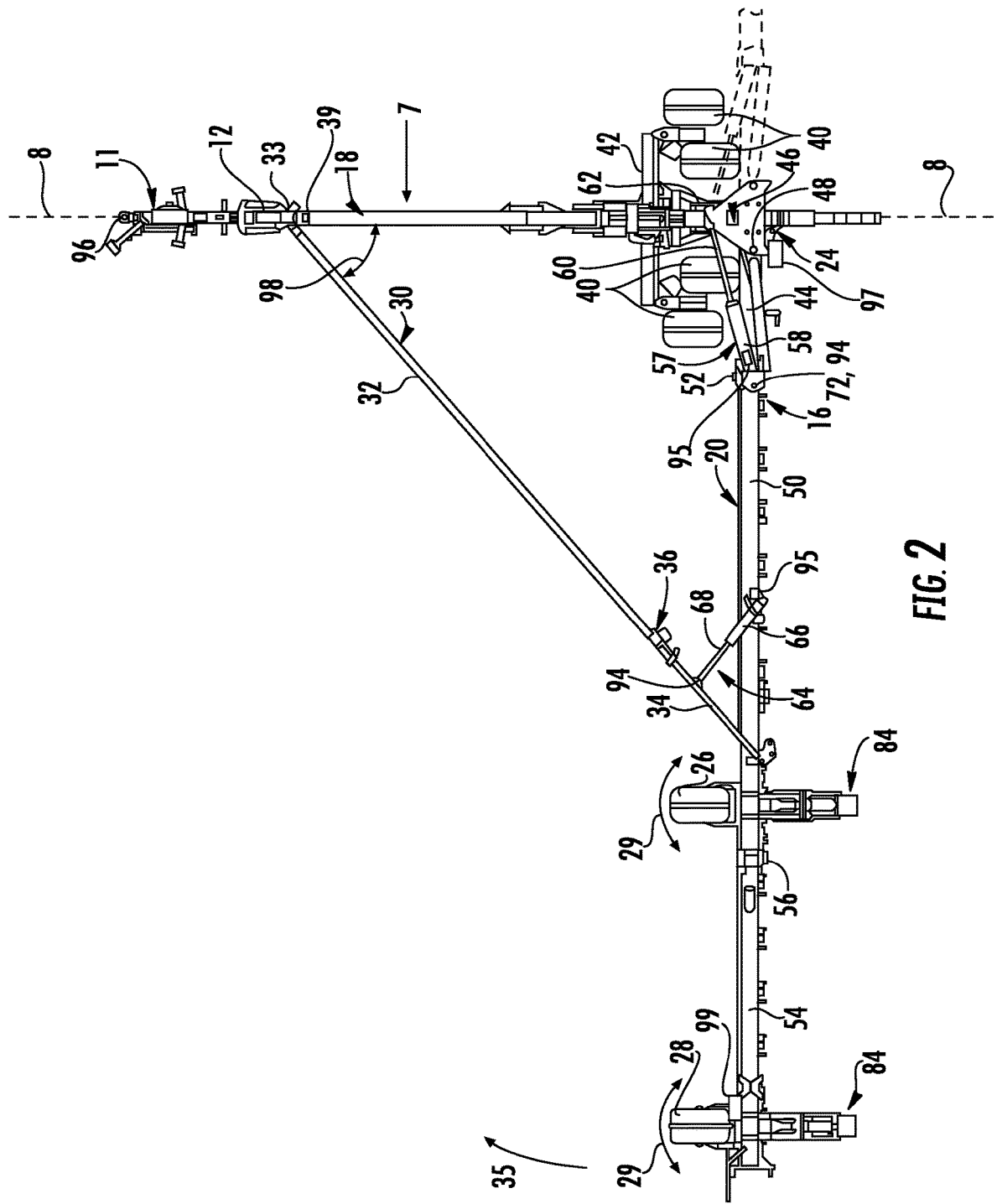
FIG. 2 illustrates a top view of a portion of the implement shown in FIG. 1, particularly illustrating a wing assembly located at its extended position.

FIG. 2 shows the wing assembly 20 in its extended, working position. In this position, the wing assembly 20 may be generally perpendicular to the central axis 8 and the central outer frame member 18. The wing assembly 20 may be supported above the ground surface 13 by caster wheels 26, 28. As will be described more fully below, the caster wheels 26, 28 provide support for the wing assembly 20 in its extended position as well as its retracted, transport position. The caster wheels 26, 28 may be designed to caster, or freely rotate (indicated by arrows 29), as the wing assembly 20 is moved from the extended position to the transport position.

The central outer frame member 18 includes a coupler 39 which couples the central outer frame member 18 to the central inner frame member 12. The central outer frame member 18 may be supported above the ground surface 13 by a set of central wheels 40 positioned adjacent each side of the central outer frame member 18. The central outer frame member 18 extends along the central axis 8 of the planter 10, which may be aligned with the hitch 11. The central wheels 40 may be coupled to a central wheel standard 42, which may be pinned to the central hinge assembly 24 at a pin 46.

The wing assembly 20 may include a center boom 44, an inner boom 50, and an outer boom 54. The center boom 44 may be connected with the central hinge assembly 24 at a pin 48, and the inner boom 50 may be connected with the center boom 44 at a pin 52. The outer boom 54 may be connected with the inner boom 50 at a pin 56. An inner actuator 57 may be connected to the center boom 44 and configured to fold and unfold the wing assembly 20 relative to the central outer member 18. For example, the inner actuator 57 may include an inner cylinder 58 connected with the center boom 44 at a pin 72 and configured to actuate a ram 60 connected with the central hinge assembly 24 at a pin 62. The wing assembly 20 may also include a draft link actuator 64 configured to pivot an outer draft link member 34 of a draft link 30 relative to the inner boom 50. For example, the draft link actuator 64 may include a draft hydraulic cylinder 66 connected with the inner boom 50 and configured to actuate a ram 68 connected to the outer draft link member 34.

The wing assembly 20 may also include an inner draft link member 32 of the draft link 30 connected with the central outer frame member 18 at a link hinge 33 and also connected with the outer draft link member 34 at a knuckle 36. The draft link members 32, 34 may provide structural support for the wing assembly 20 in the fully extended position. The knuckle 36 may allow the draft link members 32, 34 to fold relative to one another as the wing assembly 20 is folded forward to its transport position (as illustrated by arrow 35). When the wing assembly 20 is in the extended position, the inner actuator 57 and draft link actuator 64 may be fully extended, as illustrated in FIG. 2.

Figure 3:
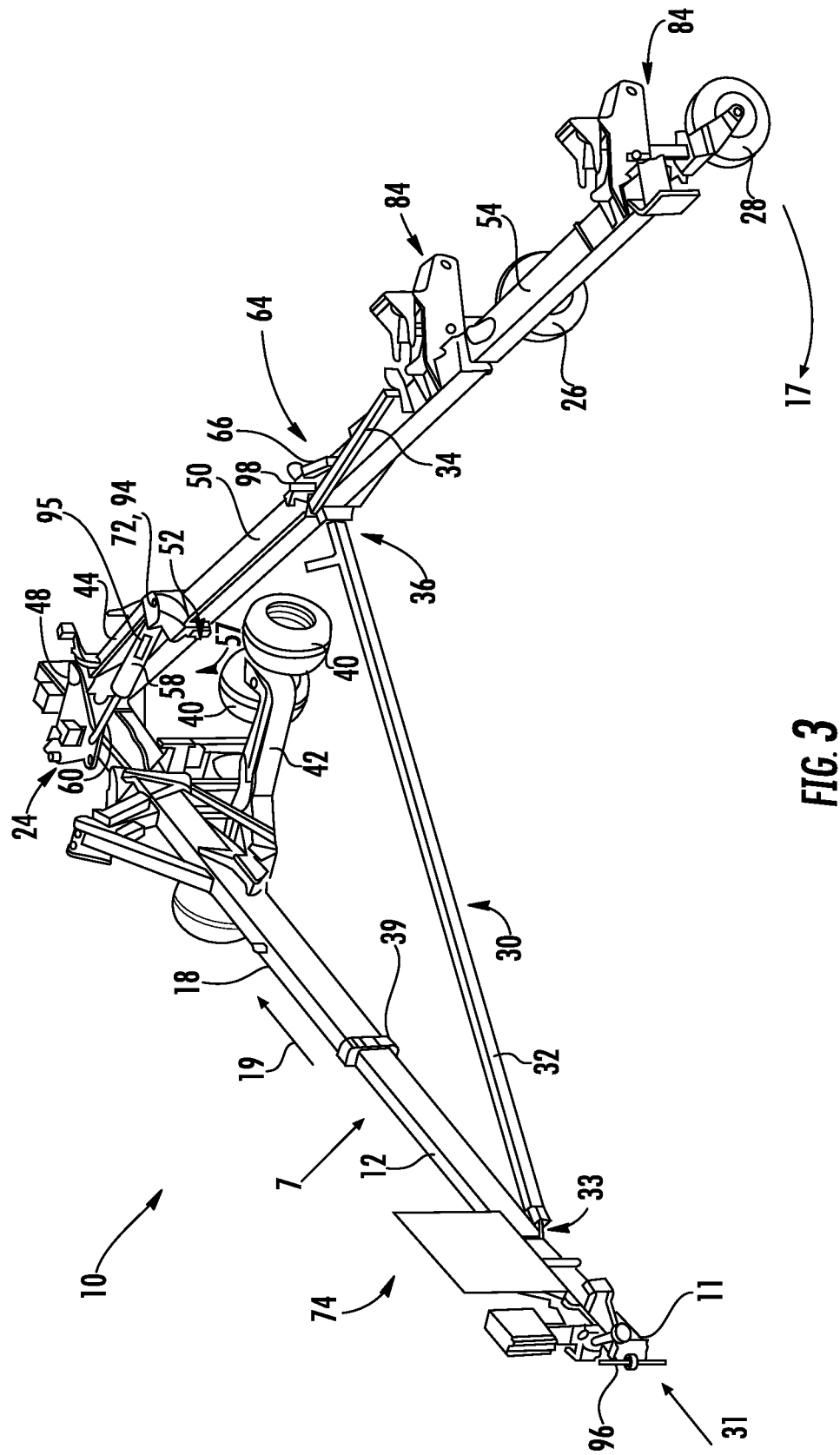
FIG. 3 illustrates a perspective view of a portion of the implement shown in FIG. 1, particularly illustrating the wing assembly located between its extended position and transport position.
Figure 4:
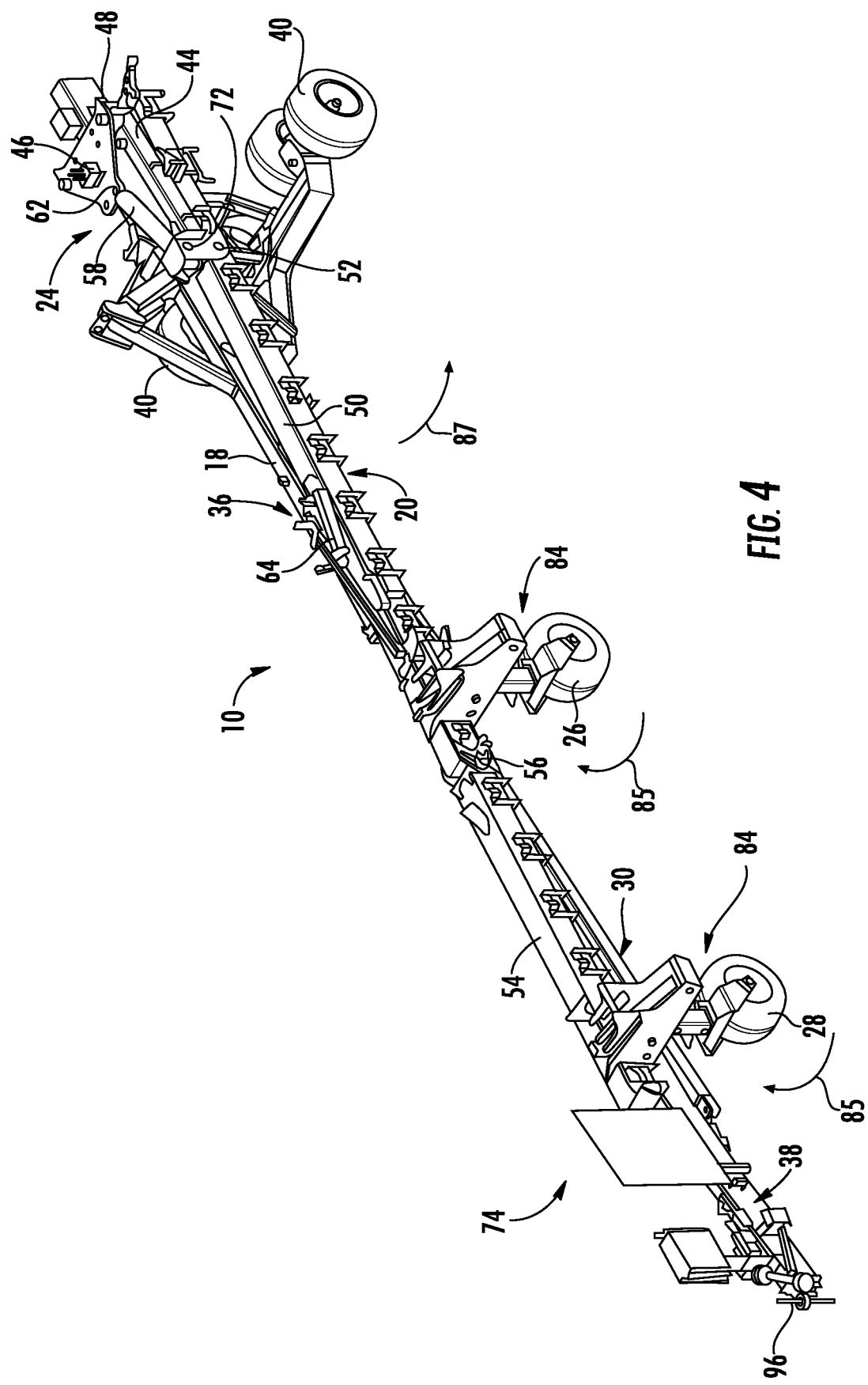
FIG. 4 illustrates a perspective view of a portion of the implement shown in FIG. 1, particularly illustrating the wing assemblies located in its transport position.

Folding of the wing assembly 20 from the extended position shown in FIG. 2 to the transport position shown in FIG. 4 will now be explained. As the actuators 57, 64 retract, the wing assembly 20 is pulled inwardly toward the central outer frame member 18 about pin 48 and eventually adjacent the central outer frame member 18 as shown in FIG. 4. More specifically, the draft link actuator 64 draws the outer draft link member 34 inward toward the inner boom 50 until the knuckle 36 abuts against the inner boom 50, as shown in FIG. 3. Once the knuckle 36 abuts the inner boom 50, the inner actuator 57 continues to retract and pivot the wing assembly 20 about pin 48 (as illustrated by arrow 17 in FIG. 3). As the inner actuator 57 continues to retract, the central outer frame member 18 telescopes relative to central inner member 12 (illustrated by arrow 19 in FIG. 3) until the wing assembly 20 is adjacent and generally parallel to the central inner frame member 12 in the transport position, as depicted in FIG. 4.

In some embodiments, the pin 48 between the center boom 44 and the hinge assembly 24 may be angled such that, as the wing assembly 20 folds (as illustrated by arrow 35 in FIG. 2), the center boom 44 angles upward allowing the outer boom 54 to sit on top of the central outer member 18, as illustrated in FIG. 4. In the transport position of the planter 10, the draft link 30 and wing assembly 20 may be folded alongside the central outer member 18. The wing assembly 20 may be latched in the transport position using a latch assembly 74 (schematically shown in FIGS. 1, 3, and 4), which may be mounted to the central inner frame member 12. The latch assembly 74 may latch the wing assembly 20 in the transport position using any suitable technique. For example, the latch assembly 74 may engage or interlock with the wing assembly 20 when the center frame section 7 of the implement 10 is raised using the hitch assembly 9 of the work vehicle 14 and/or the hitch 11 of the implement 10. Alternatively, in other embodiments, raising the center frame section 7 may not be necessary to latch the wing assemblies 20, 22. For example, the latch assembly 74 may latch the wing assemblies 20, 22 in the transport position using a tongue-and-groove configuration or any other suitable configuration.

Still referring to FIG. 4, the wheel mount assembly 84 associated with caster wheel 28 may be configured to pivot the caster wheel 28 (as shown by arrow 85) from a vertical orientation (as shown in FIG. 4) underneath the central outer member 18 and central inner member 12, and into a horizontal configuration (not shown). An actuator, such as a hydraulic cylinder, may move the caster wheel 28 between these orientations. Additionally, the wheel mount assembly 84 may also be configured to lock the caster wheel 28 in each of the vertical and horizontal orientations. Similarly, a second wheel mount assembly 84 may be associated with a second caster wheel 26 and configured to perform the above-described functions for the other caster wheel 26.

Referring back to FIG. 2, the wing assembly 20 may include various wing movement sensors configured to detect one or more wing movement parameters associated with movement of the wing assembly 20 between the extended position and the transport position. For example, in one embodiment, the wing assembly 20 may include a wing speed sensor 97 configured to measure a wing speed of the wing assembly 20.

For example, the wing assembly 20 may include a speed sensor 97 configured to detect a wing speed of the wing assembly 20 during the performance of the wing movement operation. In one embodiment, the wing speed may be an angular rate at which the wing assembly 20 is moving measured at the connection between the wing assembly 20 and the central outer frame member 18. For example, the speed sensor 97 may be an angular potentiometer associated with the wing assembly 20. As shown in FIG. 2, the speed sensor may, in one embodiment, be disposed adjacent the central hinge assembly 24 which couples the wing assembly 20 with the central outer frame member 18. In such an embodiment, the speed sensor 97 may be configured to detect the angle between the inner boom 50 and the central outer frame member 18. The speed sensor 97, however, may alternatively be disposed at any suitable joint of the frame 16 such that the measured angle is indicative of the position of the wing assembly 20 relative to the central frame outer member 18. For example, the speed sensor 97 may be an angular potentiometer configured to measure an angle 98 between the inner link member 32 and the central outer frame member 18.

Alternatively, the speed sensor 97 may be a linear potentiometer configured to detect the linear movement of the inner actuator 57 or a wheel speed sensor 97 configured to measure the speed of one of the caster wheels 26, 28 along the wing assembly 20. The relationship between these various angular rates and linear speeds may be determined based on the geometric configuration of the implement 10. Although referred to as a "speed" sensor, one of ordinary skill in the art would understand that the output of the speed sensor 97 may simply provide a sensor measurement indicative of a position (angular or linear), and subsequent processing of that signal by e.g., a planter controller 104 (FIG. 5), may be used to determine the speed of the wing assembly 20.

Additionally, in one embodiment, the wing assembly 20 may include one or more frame load cells 94 configured to detect a load applied through the frame 16 of the agricultural implement 10 during the performance of the wing movement operation. As shown in FIG. 2, a first frame load cell 94 may be disposed between the draft link actuator 64 and the outer draft link member 34 of the frame 16, for example as a load pin, such that it measures the load exerted between the draft link actuator 64 and the frame 16. A second frame load cell 94 may, for example, be disposed between the inner actuator 57 and inner boom 50, for example as a load pin, such that it measures the load exerted between the inner actuator 57 and the frame 16. However, in alternative embodiments, the load cells 94 may be disposed at any suitable location such that they may detect a load applied through the frame 16 during the wing movement operation. For example, in some embodiments, the load cell 94 may be disposed between the inner link member 32 and the link hinge 33. In other embodiments, the inner actuator 57 and/or the draft link actuator 64 may be "smart" cylinders having built-in load sensors configured to measure the load applied by or exerted on the cylinder. In other words, the load cell may be integrated in the inner hydraulic cylinder 58 and/or the draft hydraulic cylinder 66. The various load sensors described herein may be any suitable type or configuration. For example, the load sensors/cells may be piezoelectric and strain gauge sensors, and may be configured as load pins arranged at connections between two members.

Still referring to FIG. 2, the wing assembly 20 may, in several embodiments, also include a hitch load sensor 96 configured to detect a hitch load between the work vehicle 14 and the frame 16 of the agricultural implement 10. The hitch load may be the towing force exerted between the work vehicle 14 and the implement 10. For example, the hitch load sensor 96 may be configured as a load pin connecting the hitch 11 of the agricultural implement 10 with the hitch assembly 9 of the work vehicle 14. In other embodiments, however, alternative configurations are possible. For example, the hitch load sensor 96 may be built into the hitch assembly 9 of the work vehicle 14 or the hitch 11 of the implement 10 in any suitable manner such that it measures the load between the work vehicle 14 and the implement 10.

Additionally, in one embodiment, the wing assembly 20 may include one or more fluid pressure sensors 95 associated with a respective actuator configured to extend or retract with the movement of the wing assembly 20. For example, the fluid pressure sensors 95 may be associated with the draft hydraulic actuator 64 and/or the inner actuator 57. The fluid pressure sensors 95 may be configured to measure the fluid pressure of the hydraulic fluid within the draft hydraulic cylinder 66, the inner hydraulic cylinder 58, or both.

Moreover, in one embodiment, the wing assembly 20 may also include one or more caster orientation sensors 99 configured to sense respective orientation angles of the caster wheels 26, 28 relative to a forward direction of travel of the agricultural implement 10. The caster wheels 26, 28 are illustrated in FIG. 2 having an orientation angle of zero degrees, i.e., facing forward.

The wing assembly 20 may also include additional sensors. For example, the wing assembly 20 may include one or more wheel mount assembly sensors associated with the respective caster wheels 26, 28. The wheel mount assembly sensors may be configured to detect whether the wheels 26, 28 are in the vertical orientation (as shown in FIGS. 2-4), the horizontal orientation (not shown), or in-between.

Figure 5:
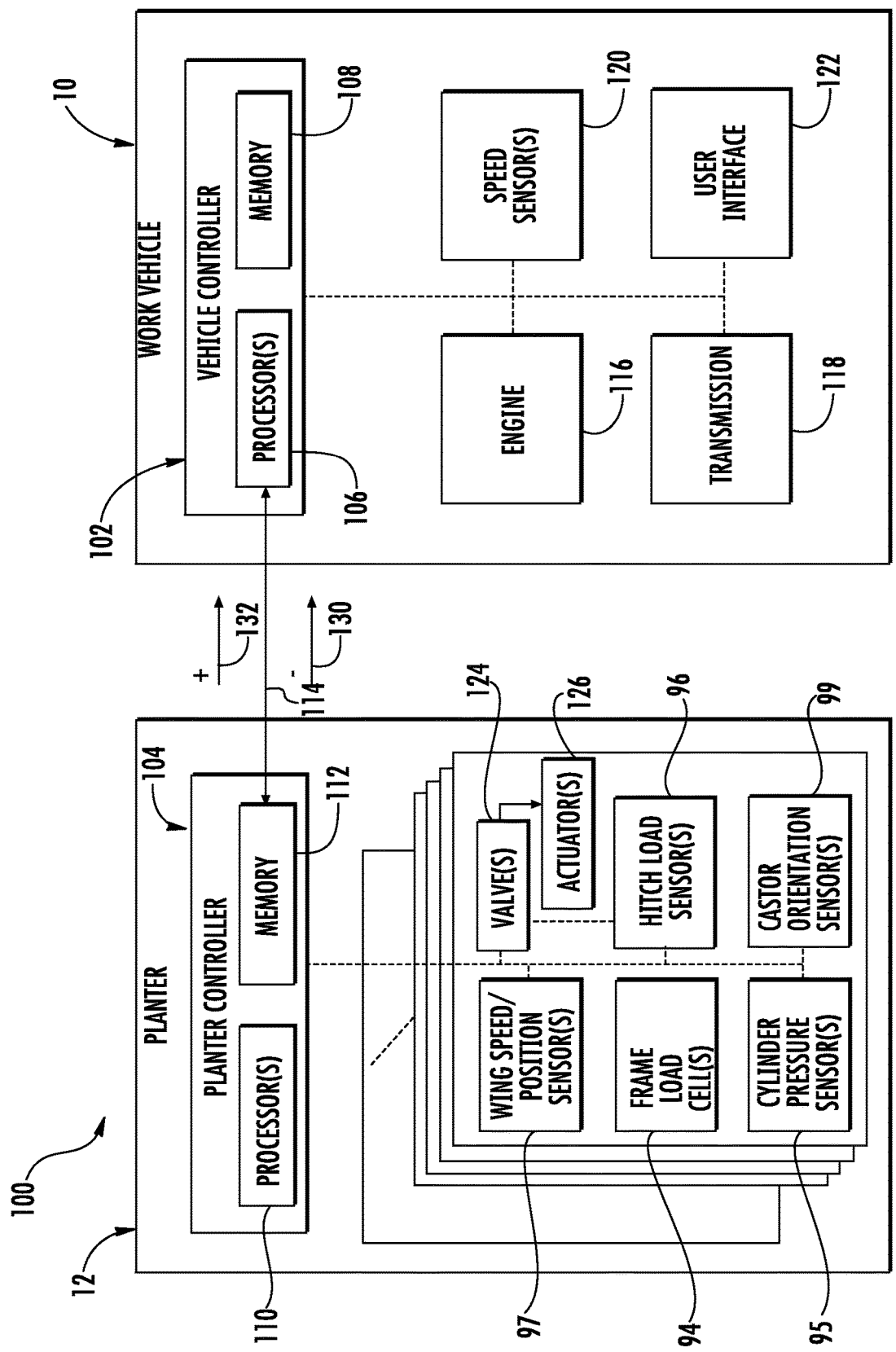
FIG. 5 illustrates a schematic view of one embodiment of a system for actuating wing assemblies of an agricultural implement configured to be towed by a work vehicle in accordance with aspects of the present subject matter.

Referring now to FIG. 5, a schematic view of one embodiment of a system 100 for automatically actuating wing assemblies 20, 22 of an agricultural implement 10 associated with a work vehicle 14 is illustrated in accordance with aspects of the present subject matter. In general, the system 100 will be described herein with reference to the work vehicle 14 and the planter 10 shown in FIGS. 1-4. However, it should be appreciated that the disclosed system 100 may be implemented with work vehicles and/or agricultural implements having any other suitable configuration.

As shown, the system 100 may generally include a vehicle controller 102 installed on and/or otherwise provided in operative association with the work vehicle 14 and a planter controller 104 installed on and/or otherwise provided in operative association with the planter 10. In general, each controller 102, 104 of the disclosed system 100 may correspond to any suitable processor-based device(s), such as a computing device or any combination of computing devices. Thus, in several embodiments, the vehicle controller 102 may include one or more processor(s) 106 and associated memory device(s) 108 configured to perform a variety of computer-implemented functions. Similarly, as shown in FIG. 5, the planter controller 104 may also include one or more processor(s) 110 and associated memory devices 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 108, 112 of each controller 102, 104 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 108, 112 may generally be configured to store suitable computer-readable instructions that, when implemented by the processor(s) 106, 110, configure each controller 102, 104 to perform various computer-implemented functions, such as one or more aspects of the control algorithm 300 described below with reference to FIGS. 6 and 7 and/or one or more aspects of the method 600 described below with reference to FIG. 9.

In addition, each controller 102, 104 may also include various other suitable components, such as a communications circuit or module, a network interface, one or more input/output channels, a data/control bus and/or the like, to allow each controller 102, 104 to be communicatively coupled to the other controller and/or to any of the various other system components described herein (e.g., the various sensors 94, 95, 96, etc.). For instance, a communicative link or interface 114 (e.g., a data bus) may be provided between the vehicle controller 102 and the planter controller 104 to allow the controllers 102, 104 to communicate with each other via any suitable communications protocol. Specifically, in one embodiment, an ISOBus Class 3 (ISO11783) interface may be utilized to provide a standard communications protocol between the controllers 102, 104. Alternatively, a proprietary communications protocol may be utilized for communications between the vehicle controller 102 and the planter controller 104.

In general, the vehicle controller 102 may be configured to control the operation of one or more components of the work vehicle 14. For instance, in several embodiments, the vehicle controller 102 may be configured to control the operation of an engine 116 and/or a transmission 118 of the work vehicle 14 to adjust the vehicle's ground speed. Specifically, as is generally understood, the vehicle controller 102 may be configured to electronically control the operation of the engine 116 by transmitting suitable control signals for controlling the engine 116 or speed governor (not shown) associated with the engine 116. Similarly, the vehicle controller 102 may be configured to control the operation of the transmission 118 by transmitting suitable control signals for controlling the engagement/disengagement of one or more clutches (not shown) provided in operative association with the transmission 118.

Additionally, the vehicle controller 102 may also be communicatively coupled to one or more sensors configured to monitor one or more operating parameters of the work vehicle 14. For instance, as shown in FIG. 5, the vehicle controller 102 may be coupled to one or more speed sensors 120 configured to monitor a speed-related parameter of the work vehicle 14. Specifically, in one embodiment, the speed sensor(s) 120 may allow the vehicle controller 102 to monitor the current ground speed and/or the current wheel speed of the work vehicle 14. In such an embodiment, the speed measurements provided by the speed sensor(s) 120 may be used as feedback by the vehicle controller 102 for controlling the operation of the engine 116 and/or the transmission 118. In addition, the speed measurements from the speed sensors 120 associated with the work vehicle 14 may also be transmitted from the vehicle controller 102 to the planter controller 104 (e.g., via the communications interface 114).

Moreover, as shown in the illustrated embodiment, the vehicle controller 102 may be communicatively coupled to a user interface 122 of the work vehicle 14. In general, the user interface 122 may correspond to any suitable input device(s) configured to allow the operator to provide operator inputs to the vehicle controller 102, such as a touch screen display, a keyboard, joystick, buttons, knobs, switches, and/or combinations thereof located within the cab 25 of the work vehicle 14. As will be described in greater detail below, to execute the automatic actuation of the wing assemblies, 20, 22, the operator may be asked to provide various inputs into the system 100 via the user interface 122. The inputs provided by the operator may then be transmitted from the vehicle controller 102 to the planter controller 104 via the communications interface 114 to allow the planter controller 104 to execute the automatic actuation of the wing assemblies, 20, 22. For example, the user interface 122 may request the operator visually inspect the area around the implement 10 and work vehicle 14 to ensure the area free of objects such that the wing assemblies, 20, 22 may be safely folded or unfolded. If the operator confirms that it is safe to proceed, he may then notify the user interface 122. Suitable operator inputs may also include, but are not limited to, maximum and minimum ground speed values for the work vehicle 14.

Still referring to FIG. 5, the planter controller 104 may generally be configured to control folding and unfolding of the wing assembly 20 during a wing movement operation. For instance, in several embodiments, the planter controller 104 may be configured to monitor, control, and/or regulate the speed of the wing assembly 20 during the wing movement operation. Specifically, as shown in FIG. 5, in one embodiment, the planter controller 104 may be communicatively coupled to one or more valves 124 configured to regulate the supply of fluid (e.g., hydraulic fluid or air) to respective actuators 126. The actuators 126 schematically illustrated in FIG. 5 may include, for example, the draft link actuator 64, the inner actuator 57, and/or an actuator associated with a wheel mount assembly 84, illustrated in FIGS. 1-4. The planter controller 104 may be configured to fold and unfold the wing assembly 20 between the extended and transport positions using one or more of the actuators 126. In other embodiments, however, the actuator 126 schematically illustrated in FIG. 5 may correspond to any actuator configured to extend or retract with the folding or unfolding of the wing assembly 20 during the wing movement operation.

Additionally, the planter controller 104 may also be communicatively coupled to the various sensors associated with the wing assembly 20 to detect or monitor a wing movement parameter associated with movement of the wing assembly 20 between the extended position and the transport position in the wing movement operation. For instance, as shown in FIG. 5, the planter controller 104 may be coupled to one or more wing speed sensor(s) 97 configured to detect the wing speed of the wing assembly 20 during the wing movement operation. Further, as shown in FIG. 5, the planter controller 104 may also be communicatively coupled to various other sensors, such as the frame load cell 94, the cylinder fluid pressure sensor 95, the hitch load sensor 96, and/or the caster orientation sensor 99, discussed previously.

Figure 6:
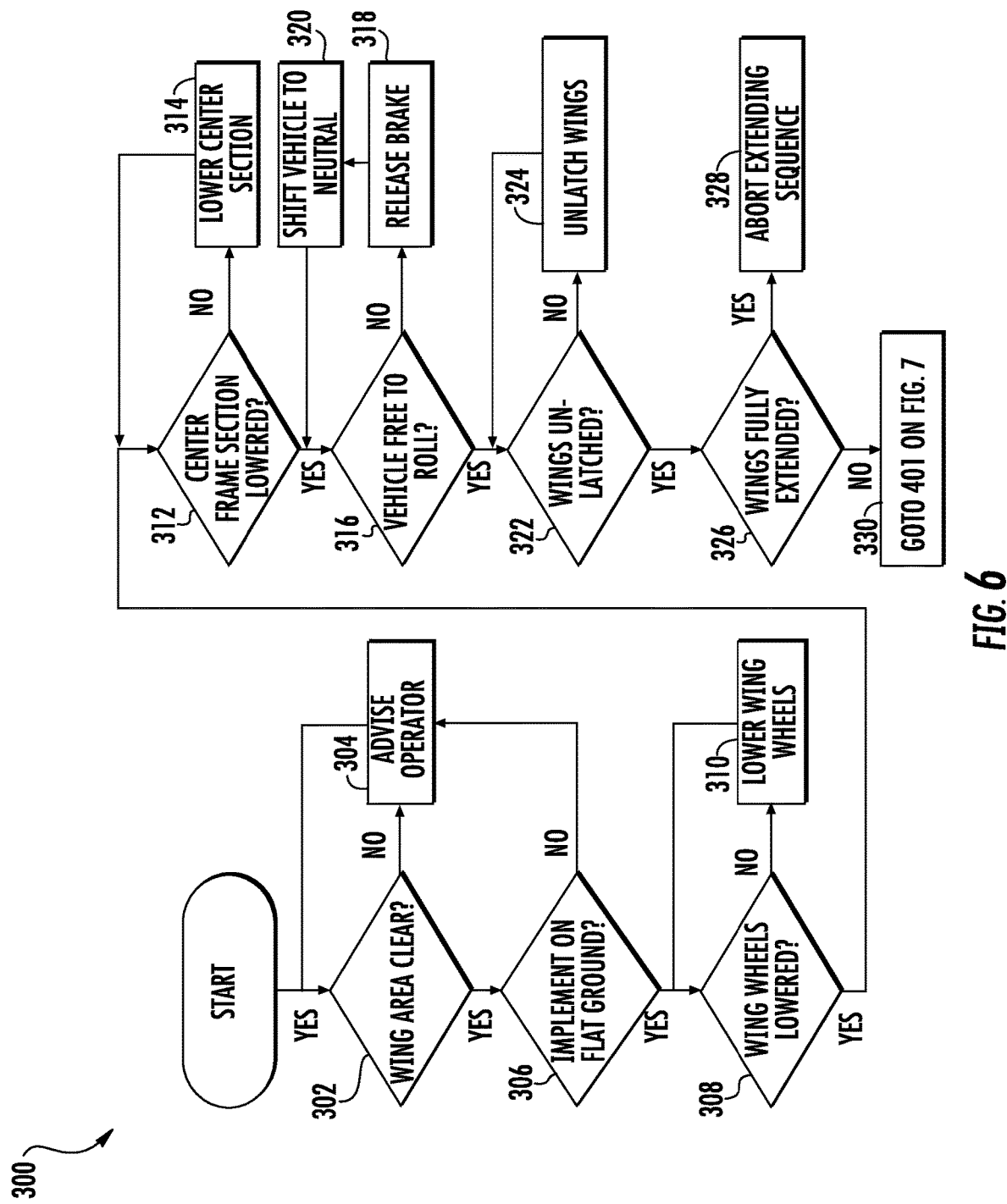
FIG. 6 illustrates a flow diagram of a control algorithm representing a specific implementation of one embodiment of a method for automatically actuating wing assemblies of an agricultural implement in accordance with aspects of the present subject matter.
Figure 7:
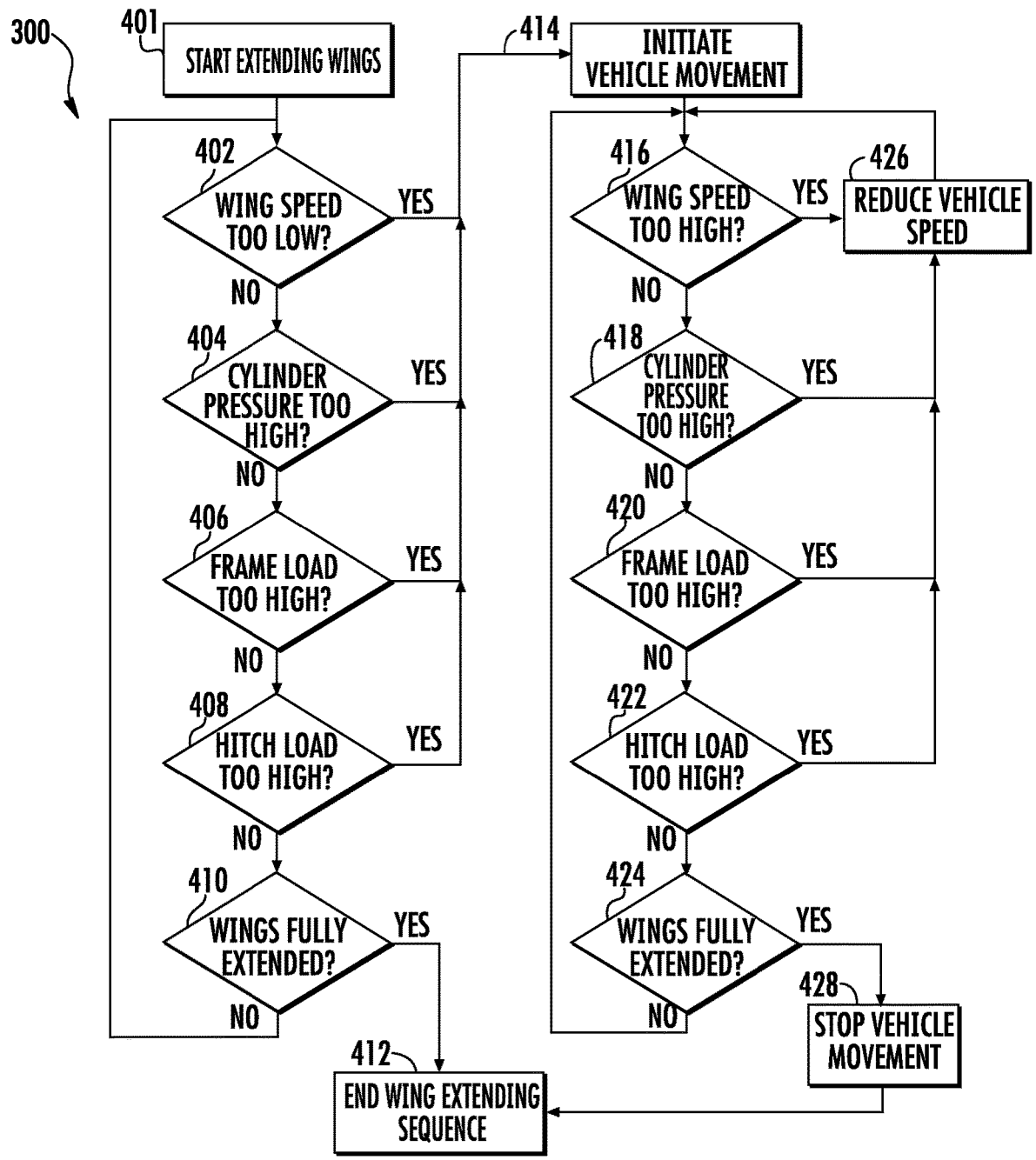
FIG. 7 illustrates a flow diagram showing a continuation of the control algorithm shown in FIG. 6.

Referring now to FIG. 6-7, a flow diagram of a control algorithm 300 providing a specific embodiment or implementation of a method in accordance with aspects of the present subject matter is illustrated. In particular, the control algorithm 300 relates to an embodiment in which the planter controller 104 is configured to monitor a first wing movement parameter and determine whether the first wing movement parameter satisfies a condition associated with a threshold value. When it is determined that the first wing movement parameter satisfies the first condition, movement of the work vehicle 14 is automatically initiated relative to the surface on which the work vehicle 14 is supported to assist the folding or unfolding of the wing assembly 20 during the performance of the wing movement operation.

In addition, although FIG. 6-7 depict steps performed in a particular order for purposes of illustration and discussion, the control algorithm 300 is not limited to any particular order or arrangement. One skilled in the art, using the disclosures provided herein, will appreciate that various steps of the control algorithm 300 can be omitted, rearranged, combined, and/or adapted in various ways without deviating from the scope of the present disclosure. Additionally, the following discussion describes the planter controller 104 as performing the various steps of the algorithm 300. One skilled in the art, however, will appreciate that the various steps of the control algorithm 300 may instead be performed by the vehicle controller 102 or a combination of the vehicle controller 102 and the planter controller 104. For example, some steps of the algorithm 300 may be performed by the vehicle controller 102 while others are performed by the planter controller 104. In other embodiments, a single step may involve both the controllers 102, 104, for example.

FIG. 6 shows a portion of a control algorithm 300 for automatically actuating wing assemblies of an agricultural implement associated with a work vehicle. Although the control algorithm 300 will be discussed with reference to the embodiment of the implement 10 illustrated in FIGS. 1-4, it should be understood that the algorithm 300 may be used to automatically actuate wing assemblies of any suitable agricultural implement associated with a work vehicle. The portion of the control algorithm 300 shown in FIG. 6 illustrates several checks that may be automatically completed to prepare for automatically extending the wing assemblies of an agricultural implement.

As shown in FIG. 6, upon initiation of the control algorithm 300, the planter controller 104 may, at (302), determine whether the area surrounding the wing assembly 20 is clear of obstructions (e.g., equipment, people etc.) such that the wing assembly 20 can be safely folded. This may include prompting the operator to visually confirm that the area is clear. Alternatively, the planter controller 104 may be configured to automatically sense whether the area is clear using one or more visual sensors (e.g., one or more cameras, radar devices, LIDAR devices, and/or the like). If the area surrounding the wing assembly 20 is not clear, then the planter controller 104 may advise the operator, at (304), that the area must be cleared before continuing. For example, the user interface 122 may display an instruction to remove the obstacle from the area, or move the work vehicle 14 to a new location free of obstacles. The planter controller 104 may then again determine whether the area surrounding the wing assembly 20 is clear, at (302).

If the planter controller 104 determines the area to be clear, the planter controller 104 may, at (306), determine whether the implement 10 is on flat ground suitable for performing the folding operation. For example, the planter controller 104 may prompt the operator to confirm that the implement 10 is on ground 13 that is sufficiently level and even to safely perform the folding operation. Alternatively, the planter controller 104 may be connected with one or more sensors configured to detect whether the work vehicle 14 and the implement 10 are on ground having too great of a slope, or grade, to safely perform the folding operation. If the implement 10 is not determined to be on sufficiently level and even ground, then the planter controller 104 may advise the operator to relocate the work vehicle 14 and planter 10 to a suitable location before continuing.

If the implement 10 is determined to be on sufficiently flat ground, the planter controller 104 may, at (308), determine whether the caster wheels 26, 28 are lowered in the vertical orientation (as shown in FIG. 4). The planter controller 104 may be configured to detect the orientation of the respective wheel mount assemblies 84 using respective wheel mount assembly sensors. Alternatively, the planter controller 104 may request that the operator visually confirm that the caster wheels 26, 28 are lowered into the vertical orientation. If the wing wheels 26, 28 are not lowered into the vertical orientation, the planter controller 104, at (310) may automatically lower the wing wheels 26, 28 by controlling a valve 124 regulating the flow of hydraulic fluid to an actuator 126 associated with the wheel mount assemblies 84.

Similarly, the planter controller 104 may determine, at (312), whether the center frame section 7, which includes the central frame members 12, 18, is lowered with respect to the ground 13. The planter controller 104 may send a request to the vehicle controller 102 for the position of the hitch assembly 9 of the work vehicle 14. As previously noted, the hitch assembly 9 may include actuators and linkages configured to raise and lower the central frame members 12, 18 between a lowered position and a raised position. The hitch assembly 9 may also include one or more sensors configured to detect the position of the central frame members 12, 18. Alternatively, in another embodiment, as addressed above, the hitch 11 of implement 10 may be configured to raise and lower the center frame section 7. For this embodiment, the hitch 11 may similarly include sensors configured to determine the position of the center frame section 7.

If the center frame section 7 is not determined to be in the lowered position, then, at (314), the planter controller 104 send an instruction to the vehicle controller 102 to lower the center frame section 7 of the implement 10 using the hitch assembly 9, or using the hitch 11 of the implement 10, as applicable.

At (316), the planter controller 104 may determine whether the work vehicle 14 is free to roll relative to the ground 13. This may include checking whether a brake of the work vehicle 14 is released, i.e., disengaged, and whether the transmission 118 of the work vehicle 14 is in a neutral condition. If the work vehicle 14 is not free to roll relative to the ground 13, the planter controller 104 may, at (318), release the brake, and/or, at (320), automatically shift the transmission 118 of the work vehicle 14 to neutral. This may include sending one or more requests to the vehicle controller 102 for the vehicle controller 102 to complete these actions.

The planter controller 104 may determine, at (322), whether the wings are unlatched such that they may be unfolded from the transport to the extended position. The planter 10 may include one or more sensors configured to detect the status of the latch assembly 74. If the planter controller 104 determines that the wings are not unlatched, then at (324), the planter controller 104 may unlatch the wings. For example, as noted above, the planter controller 104 may be communicatively coupled to one or more valves 124 configured to regulate the supply of fluid (e.g., hydraulic fluid or air) to respective actuators 126. One such actuator may be configured to actuate the latch assembly 74 between a latched position and an unlatched position. Alternatively, according to another embodiment of the planter 10, to unlatch the wing assemblies 20, 22, the planter controller 104 may further lower the center frame section 7, which includes the central inner and outer members 12, 18.

The planter controller 104, at (326), may check whether the wing assembly 20 is already in the extended position. Referring to the embodiment of the implement 10 described above with reference to FIG. 1-4, this may include determining the position of the wing assemblies 20, 22 relative to the center frame section 7. If the planter controller 104 determines that the wing assembly 20 is already fully extended, then, at (328), the planter controller 104 may abort the extending sequence. If the planter controller 104 determines that the wing assembly 20 is not already fully extended, then, at (330), the wing assembly 20 may continue with the wing extending sequence and proceed to (401) on FIG. 7.

FIG. 7 shows a portion of the control algorithm 300 for automatically actuating wing assemblies of an agricultural implement associated with a work vehicle. The planter controller 104 may, at (401), start extending the wing assemblies, 20, 22. This may include controlling one or more valves 124 to regulate the supply of fluid (e.g., hydraulic fluid or air) to a respective actuator 126. For example, the planter controller 104 may actuate the inner actuator 57 to pivot the wing assembly 20 about pin 48 to extend the wing assembly 20 (illustrated by arrow 87 in FIG. 4).

As the wing assemblies 20, 22 are moved to the extended position, the planter controller 104 may be configured to monitor a first wing movement parameter associated with folding or unfolding the wing assembly 20 of the agricultural implement 10. Examples of wing movement parameters may include, but are not limited to, a wing speed of the wing assembly 20, a load applied through the frame 16 of the agricultural implement 10, and a hitch load between the work vehicle 14 and the frame 16 of the agricultural implement 10. The planter controller 104 may monitor the first wing movement parameter to determine whether the wing movement operation is proceeding as desired. For example, the monitored wing movement parameters may be indicative of the progress or status of the wing movement operation and whether assistance is needed to complete the wing movement operation and/or avoid damage to the implement 10. As such, the planter controller 104 may determine whether the first wing movement parameter satisfies a first condition associated with a first predetermined threshold value defined for the wing movement operation. For example, excessive load on the frame 16 may indicate that the wing movement operation needs assistance to be safely completed. When it is determined that the first wing movement parameter satisfies the first condition, the planter controller 104 may automatically initiate movement of the work vehicle 14 relative to a surface 13 on which the work vehicle 14 is supported to assist the folding or unfolding of the wing assembly 20 during the performance of the wing movement operation.

In some embodiments, the planter controller 104 may also be configured to automatically reduce a speed at which the work vehicle 14 is being moved when it is determined that a second wing movement parameter satisfies a second condition associated with a second predetermined threshold value defined for the wing movement operation. In one embodiment, the second wing movement parameter may be selected from the same group of example wing movement parameters listed above or from a different group of parameters, and may be the same as or different than the first wing movement parameter. For example, in one embodiment, the planter controller 104 may be configured to reduce the speed of the work vehicle 14 during the wing movement operation when the planter controller 104 determines that the wing assembly 20 is moving excessively fast and/or detects excessive load on the frame 16 of the implement 10.

The algorithm 300 shown in FIG. 7 provides one example of a specific implementation of the disclosed method. As such, the algorithm 300 provides one example set of wing movement parameters. In other embodiments, the planter controller 104 may be configured to monitor only one wing movement parameter, and may be configured to initiate and/or reduce vehicle speed based on this wing movement parameter alone, for example. However, in yet other embodiments, the planter controller 104 may be configured to initiate and/or reduce vehicle speed based on any combination or subset of the wing movement parameters discussed in the following implementation of the disclosed method.

Referring to FIG. 7, the planter controller 104, at (402), may determine whether the speed of the wing assembly is too low. For example, the planter controller 104 may monitor the wing speed of the wing assembly 20 based on signals received from one or more of the wing speed sensors 97 and determine whether the monitored wing speed is less than a minimum wing speed threshold. For example, the minimum wing speed threshold may be selected based on a desired wing speed when operating under ideal conditions. The minimum wing speed threshold may be indicative of significant resistance to movement of the wing assembly 20, for example, between the wheels 26, 28 of the wing assembly 20 and irregularities in the ground surface 13. Additionally, the minimum wing speed threshold may be selected based on practical considerations, such as a desired total time for the wing movement operation to be performed.

If the wing speed is not too low, the planter controller 104, at (404), may determine whether the cylinder pressure is too high. For example, the planter controller 104 may monitor a fluid pressure associated with an actuator configured to extend or retract with the folding or unfolding of the wing assembly 20 based on signals received from one or more of the cylinder pressure sensors 95. The planter controller 104 may determine whether the monitored fluid pressure exceeds an actuator pressure threshold value. For example, referring to the embodiment of the implement 10 shown in FIG. 1-4, the planter controller 104 may determine whether the fluid pressure within the draft hydraulic cylinder 66 of the draft hydraulic actuator 64 exceeds a first actuator pressure threshold value. In some embodiments, the planter controller 104 may additionally determine whether the fluid pressure of the hydraulic fluid within the inner hydraulic cylinder 58 of the inner actuator 57 exceeds a second actuator pressure threshold value. To prevent damage to the implement 10 and associated actuators 57, 64, these respective threshold values may be selected based design load limits for actuators 57, 64 or adjacent structural components or hinges of the frame 16, for example.

If the cylinder pressure is not too high, the planter controller 104 may, at (406), determine whether the frame load is too high. For example, the planter controller 104 may monitor a load applied through the frame 16 of the agricultural implement 10 based on signals received from the frame load cell(s) 94, which may be disposed at any suitable location on the implement 10. The planter controller 104 may determine whether this monitored load exceeds a maximum load threshold. The maximum load threshold may be selected to prevent damage to the frame 16 based on design considerations for the frame 16, such as a load limit, factor or safety, yield strength, and/or the like for the relevant structure and/or materials.

For example, referring to the embodiment of the implement 10 shown in FIG. 1-4, the planter controller 104 may monitor the frame load between the draft link actuator 64 and the outer draft link member 34 based on signals from the first frame load cell 94. In some embodiments, the planter controller 104 may also monitor the frame load between the inner actuator 57 and inner boom 50 based on signals from the second frame load cell 94. Frame load cells 94 may be disposed at any suitable location on the frame 16 to measure relevant loads.

If the frame load is not too high, at (408), the planter controller 104 may determine whether the hitch load is too high. For example, the planter controller 104 may monitor a load applied between the work vehicle 14 and the implement 10 based on signals received from one or more hitch load sensors 96. The planter controller 104 may determine whether the monitored hitch load exceeds a maximum hitch load threshold. For example, referring to the embodiment of the implement 10 shown in FIG. 1-4, the planter controller 104 may monitor a load between the hitch 11 of the implement 10 and the hitch assembly 9 of the work vehicle 14 based on signals from the hitch load sensor 96. In some embodiments, the planter controller 104 may be configured to determine whether the absolute value of the monitored hitch load exceeds the maximum hitch load threshold. The maximum hitch load threshold may be selected to prevent damage to the frame 16 and/or hitch 11 based on design considerations, such as a load limit, factor or safety, yield strength, and/or the like for relevant structure and/or materials.

If the hitch load is not too high, the planter controller 104 may, at (410), determine whether the wing assemblies, 20, 22 have reached the fully extended position based on signals received from one or more of the wing position sensors 97. If the wing assemblies, 20, 22 have reached the fully extended position, the planter controller 104 may, at (412), end the wing extending sequence.

If the planter controller 104 determines that one or more of the conditions described above with reference to (402)-(408) is met, the planter controller 104 may, at (414), automatically initiate a vehicle movement to assist unfolding of the wing assembly 20. For example, the planter controller 104 may transmit a speed control request (indicated by arrow 132 in FIG. 5) requesting that the vehicle controller 102 initiate movement of the work vehicle 14 relative to the ground 13. The planter controller 104 may initiate this movement at a predetermined initial speed, for example.

In some embodiments, the algorithm 300 may require that two or more of the conditions described above with reference to (402)-(408) are met. For example, in one embodiment the planter controller 104 may be configured to initiate vehicle movement, at (414), when each of the wing speed condition, at (402), and the hitch load condition, at (408), are met. In other embodiments, the conditions may be combined in other ways. For example, in another embodiment, the planter controller 104 may be configured to initiate vehicle movement, at (414), when the wing speed condition, at (402), is met and additionally either the frame load condition, at (406), or the hitch load condition, at (408), is met. Further, in another embodiment, the planter controller 104 may be configured to initiate vehicle movement, at (414), when each of the conditions, at (402)-(408), is met. One of ordinary skill in the art would understand further combinations are possible based on the disclosure herein.

For the embodiment of the implement 10 shown in FIG. 1-4, for example, the planter controller 104 may initiate a rearward movement of the work vehicle 14 to assist unfolding of the wing assemblies 20, 22 toward the extended position. The intent is to increase the wing speed of the wing assemblies, 20, 22 and reduce the load on the frame of the implement 10 and associated actuators 57, 64. For example, such assistance may reduce one or more of the cylinder pressure, frame load, and hitch load measured in (404)-(408) to within acceptable ranges.

For the embodiment of the implement 10 illustrated in FIG. 1-4, movement of the work vehicle 14 in a rearward direction assists unfolding of the wing assemblies, 20, 22. For other configurations, however, a forward movement of the work vehicle 14 may assist unfolding, and, accordingly, for such a configuration, it may be appropriate for the planter controller 104 to initiate a forward, instead of rearward, movement of the work vehicle 14 to assist unfolding of the implement 10.

As indicated above, in some embodiments, the planter controller 104 may also be configured to automatically reduce a speed at which the work vehicle 14 is being moved when it is determined that a second wing movement parameter satisfies a second condition associated with a second predetermined threshold value defined for the wing movement operation. The second wing movement parameter(s) may, in one embodiment, be selected from the same group of example wing movement parameters discussed above with reference to initiating the vehicle movement or from a different group of parameters. As such, the second wing movement parameter(s) may be the same as or different than the first wing movement parameter(s). For example, in one embodiment, the planter controller 104 may be configured to reduce the vehicle speed based on a single second wing movement parameter, such as the wing speed. In other embodiments, for example, the planter controller 104 may be configured to reduce the vehicle speed based on the wing speed and/or excessive frame load. As indicated above, it should be appreciated that the algorithm 300 illustrated in FIGS. 6 and 7 is merely an example of a specific implementation of the disclosed method. As such, the wing movement parameters discussed below are merely examples of suitable parameters that may be used when implementing embodiments of the disclosed algorithm.

Returning to FIG. 7, the planter controller 104 may, at (416), determine if the wing speed is too high. The planter controller 104 may measure the wing speed based on signals from the wing speed sensor 97. The planter controller 104 may compare the wing speed to a second predetermined threshold value, which may be an upper speed limit for example, to determine if the wings are unfolding too fast. This may prevent the wing assemblies, 20, 22 from unfolding at an unsafe rate which could damage the implement 10. For example, an excessive unfolding speed could damage one or more of the actuators 57, 64 which are configured to extend or retract with the folding of the wing assembly 20. Some hydraulic cylinders have inherent speed limits based on the size and configuration of the hydraulic cylinder, connection hoses, and other components of the hydraulic system. Forcing such cylinders to compress or extend faster than such a limit could damage the cylinder's internal seals, the hydraulic system's hoses, or other components. Additionally, an excessive folding speed may damage the frame of the implement 10. For example, as the wing assemblies, 20, 22 reach the fully extended position, they may impact the various mechanical stops preventing the wings from extending beyond the extended position.

If the wing speed is not too high, the planter controller 104 determines the following: whether the cylinder pressure is too high at (418), whether the frame load is too high at (420), and whether the hitch load is too high at (422). These determinations are made in a similar manner as described above with respect to (404), (406), and (408), respectively. However, for (418), (420), and (422), the planter controller 104 may determine whether each respective wing movement parameter exceeds a respective second predetermined threshold value. In some embodiments, each second predetermined threshold value may be different than each first predetermined threshold value. In other embodiments, however, the respective first and second predetermined threshold values may be the same. For example, in one embodiment, the first predetermined threshold value for the frame load may be the equal to its second predetermined threshold value; but the first predetermined threshold value of the hitch load may be greater than the second predetermined threshold value of the hitch load etc.

If the planter controller 104 determines that the wing speed exceeds its respective second predetermined threshold value, at (416), or that one or more of the other wing movement parameters, in (418), (420), and (422), exceeds its respective second predetermined threshold value, then the planter controller 104 may reduce the vehicle speed, at (426). In some embodiments, the planter controller 104 may be configured to reduce the vehicle speed, at (426), based on a combination of the conditions, at (416)-(420). In some embodiments, the planter controller 104 may be configured to reduce the vehicle speed, at (426), when two or more of the conditions are met, as described with reference to initiating vehicle movement, at (414). For example, in some embodiments, the planter controller 104 may be configured to reduce vehicle speed, at (426), when each of the wing speed condition, at (416), and the cylinder pressure condition, at (418) is met. In another embodiment, the planter controller 104 may be configured to reduce vehicle speed, at (426), when each of the wing speed condition, at (416), and the cylinder pressure condition, at (418) is met and additionally at least one of the frame load condition, at (420), or the hitch load condition, at (422) is met.

To reduce the vehicle speed at (416), the planter controller 104 sends a speed control request 130 to the vehicle controller 102 requesting that the vehicle controller 102 reduce the speed of the work vehicle 14. Reducing the vehicle speed may reduce the load on the frame 16 or actuators 126 associated with the frame 16. In addition to reducing the speed of the work vehicle 14, in some embodiments, the planter controller 104 may also control the valves 124 associated with the actuators 126 to slow the wing speed and further reduce load on the frame 16.

Although the algorithm was described above with reference to multiple wing movement parameters (e.g., wing speed, cylinder pressure), in some embodiments, the planter controller 104 may be configured to reduce the vehicle speed based on a single wing movement parameter or any combination or subset of the wing movement parameters discussed herein. As such, the various steps depicted FIG. 7 with reference to initiating and reducing vehicle speed may be omitted, rearranged, combined, and/or adapted in various ways without deviating from the scope of the present disclosure.

Upon reducing the vehicle speed at (426), the planter controller 104 may then continue to monitor each wing movement parameter at (416), (418), (420), and (422). These wing movement parameters may vary with the speed of the work vehicle 14. For example, the wing speed may decrease or increase as the speed of the work vehicle 14 is decreased or increased. The planter controller 104 may compare the absolute value of each wing movement parameter to the second predetermined threshold because moving the work vehicle 14 too fast may cause these parameters to reverse sign. For example, an excessive compression load on a component of the frame 16 may cause the planter 104 to initiate vehicle movement. Excessive vehicle speed, however, may then cause such a compression load to reverse sign into a tension load. Accordingly, the planter controller 104 may compare an absolute value of the wing movement parameter with a respective second predetermined threshold at (418), (420), and (422).

Once the planter controller 104 determines that the wing assemblies, 20, 22 are fully extended, at (424), the planter controller 104 may stop the work vehicle movement, at (428), and end the wing extending sequence, at (412). Additionally, in some embodiments, if the planter controller 104 determines that assistance is no longer needed, the planter controller 104 may cause the work vehicle 14 to stop moving before the wing movement operation is complete. Additionally, in some embodiments, the planter controller 104 may be configured to increase the vehicle speed based on monitoring the wing movement parameters with respect to the first predetermined threshold, the second predetermined thresholds, and/or a third predetermined threshold. For example, after the planter controller 104 has reduced the vehicle speed, the wing movement parameter(s) may indicate that the vehicle speed may be safely increased such that the wing speed may be increased without causing an excessive frame load or hitch load.

Moreover, in some instances, reducing the vehicle speed, at (426), may not satisfactorily reduce the wing movement parameters below their respective second predetermined thresholds. In this case, although not illustrated in FIG. 7, the planter controller 104 may stop the vehicle movement, abort the extending sequence, and notify the operator that the wing movement operation cannot be safely finished. This may advantageously prevent damage to the implement 10.

The algorithm 300 has been described with regard to extending the wing assembly 20 from the transport position to the extended position. However, it should be appreciated that algorithms for folding the wing assembly 20 follow similar logic, include similar steps, and are within the scope of this disclosure. For example, folding of the wing assembly 20 from the extended position to the transport position may include determining whether the wing area is clear and the implement 10 is on level ground and advising the operator if the wing area needs to be cleared or the implement 10 moved to more level ground. Folding the wing assembly may also include raising the wheels 26, 28 of the wing assembly 20, raising the center frame section 7, and/or shifting the vehicle 14 to neutral and releasing the brake of the vehicle 14. The planter controller 104 may also be configured to initiate a folding movement and monitor one or more wing movement parameters during the folding operation. Additionally, the planter controller 104 may be configured to initiate a vehicle movement based on a first wing movement parameter satisfying a first condition associated with a first predetermined threshold value. The planter controller 104 may similarly be configured to reduce the vehicle speed based on a second wing movement parameter satisfies a second condition associated with a second predetermined threshold value. The wing movement parameter (s) selected as the first wing movement parameter(s) may be the same as or different than the wing movement parameter (s) selected as the second wing movement parameter(s). Similarly, the first and second predetermined threshold values may be the same as or different than each other.

After completion of an unfolding/extending operation, the implement controller 104 may automatically sense an orientation angle of a caster wheel of the agricultural implement 10 relative to a forward direction of the agricultural implement 10. For example, the agricultural implement 10 may sense the orientation angle of one or more of the caster wheels 26, 28 based on signals from the caster orientation sensor 99. The implement controller 104 may compare the sensed orientation angles of one or more of the caster wheels 26, 28 to a predetermined angle range relative to the forward direction. For example, the implement controller 104 may determine whether one or more of the sensed orientation angles is within −10 and +10 degrees of forward. In other embodiments, the predetermined angle range may be larger, for example −20 to +20 degrees. If the sensed orientation angle(s) of the caster wheels 26, 28 falls outside the predetermined angle range, the implement controller 104 may initiate a movement of the work vehicle movement 14 relative to the ground 13 to adjust the orientation angle of one or more of the caster wheels 26, 28. For example, the implement controller 104 may send a request 132 to the vehicle controller 102 to initiate a forward movement of the work vehicle 14 at a predetermined speed and for a predetermined period of time. This movement may cause the caster wheels 26, 28 to rotate to a forward orientation. The implement controller 104 may confirm that the orientation(s) of the caster wheels 26, 28 is within the predetermined angle range.

Figure 8:
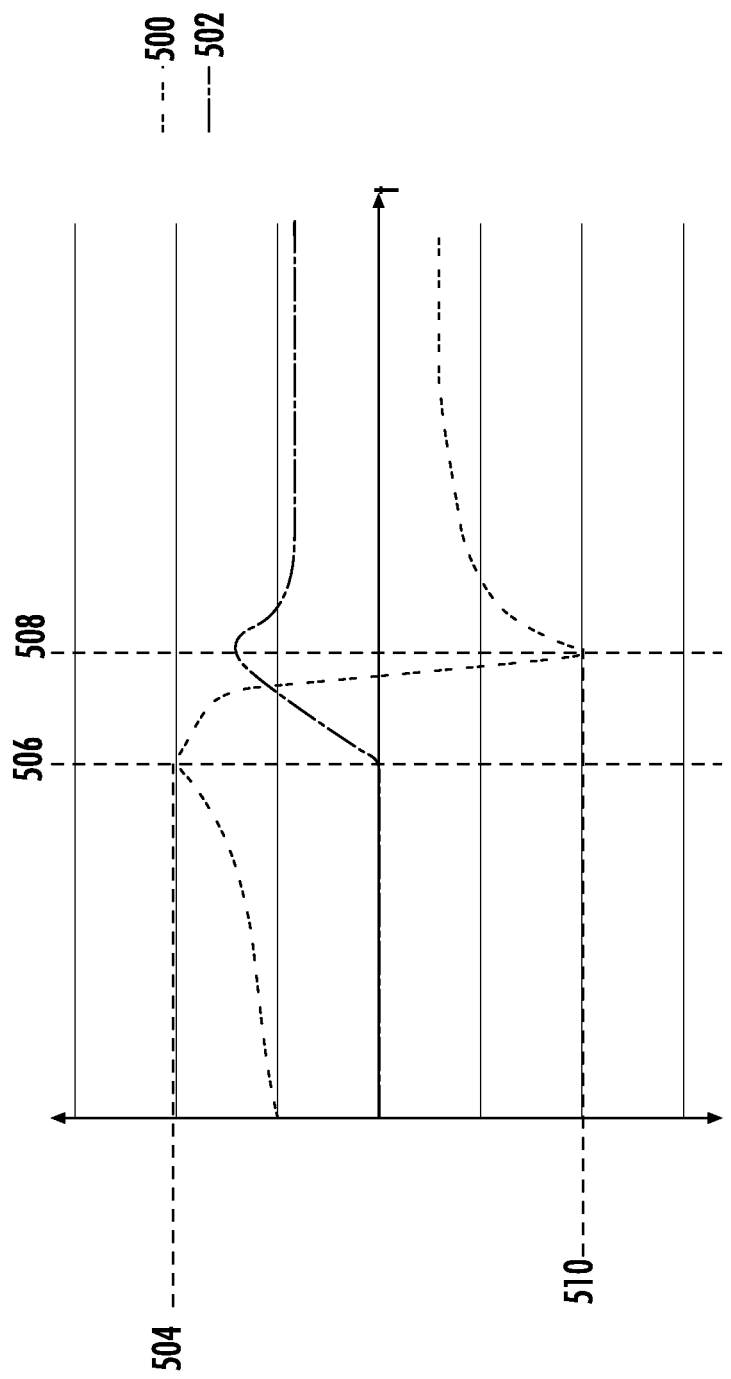
FIG. 8 illustrates a plot of a hypothetical example in which a wing movement parameter and vehicle speed vary with time.

Application of the algorithm 300 illustrated in FIG. 7, will now be illustrated with a hypothetical example. Referring to FIG. 8, time is represented on the horizontal axis, and both the frame load 500 and vehicle speed 502 are plotted on the vertical axis. At t=0, the planter controller 104 starts extending the wing assembly 20, at (401 in FIG. 7). As the wing speed increases, the wing assembly 20 resists the extending movement and the frame load 500 increases. The frame load 500 increases until it exceeds the first predetermined threshold 504 at time 506 on FIG. 8. The planter controller 104 determines that the frame load is too high, at (406 in FIG. 7), and, initiates a vehicle movement to assist the extending movement, at (414 in FIG. 7). As the vehicle speed 502 increases, it reduces the frame load from time 506 to time 508. The vehicle speed 502 however becomes too great and causes the frame load 500 to become negative. For example, the frame load may have transitioned from compression to tension. At time 508, the absolute value of the frame load 500 exceeds the second predetermined threshold 510. The planter controller 104, at (420 in FIG. 7), determines that the absolute value of the frame load is too high, and, at (426 in FIG. 7), reduces the vehicle speed 502. This reduction in speed causes the absolute value of the frame load 500 to decrease. For example, the tension in the frame has lessened as a result. From time 508 onward the vehicle speed 502 and frame load 500 decrease until they reach a steady state. The vehicle speed 502 and frame load 500 remain constant in the steady state until the wing movement operation is complete and the wings are fully extended, which is not shown in FIG. 8. This hypothetical example depicted in FIG. 8 is only one illustrative example of how algorithm 300 may function to automatically assist a wing movement operation. In other uses, however, the wing movement parameter may remain positive at all times, instead of becoming negative as illustrated in FIG. 8.

Figure 9:
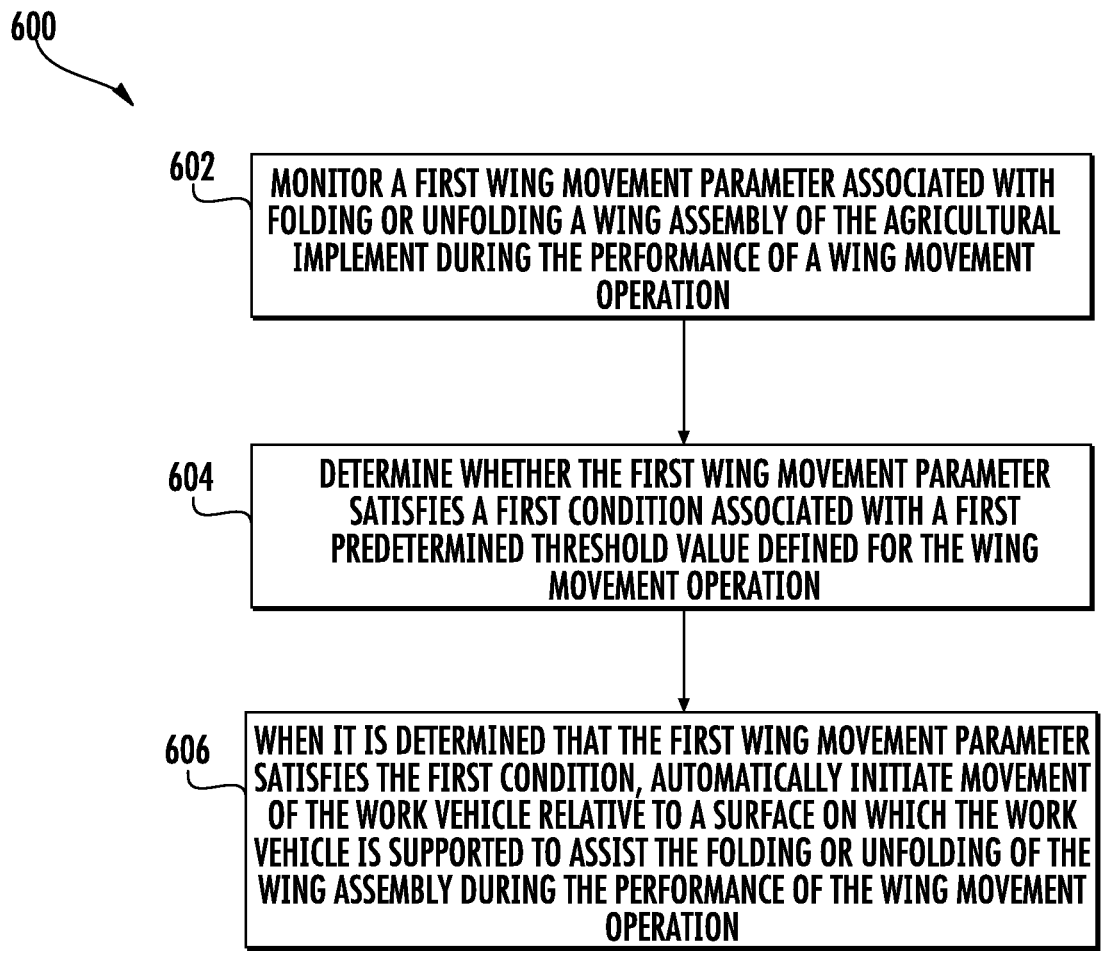
FIG. 9 illustrates a flow diagram of one embodiment of a method for automatically actuating wing assemblies of an agricultural implement in accordance with aspects of the present subject matter.

Referring to FIG. 9, a flow diagram of one embodiment of a method 600 for automatically actuating wing assemblies of an agricultural implement associated with a work vehicle is illustrated in accordance with aspects of the present subject matter. In general, the method 600 will be described herein with reference to the work vehicle 14 and the implement 10 shown in FIG. 1-4, as well as the various system components shown in FIG. 5. However, it should be appreciated that the disclosed method 600 may be implemented with work vehicles and implements having any other suitable configurations and/or within systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As indicated above, various aspects of the disclosed method 600 may be configured to be executed by the planter controller 104 and/or vehicle controller 102 to assist a wing movement operation of the implement 10 by initiating movement of a work vehicle 14 associated with the implement 10. As shown in FIG. 9, at (602), the method 600 may include monitoring, with one or more of the controllers 102, 104, a first wing movement parameter associated with folding or unfolding a wing assembly 20 of the agricultural implement 10 during the performance of a wing movement operation. The method 600 may also include, at (604), determining, with one or more of the controllers 102, 104, whether the first wing movement parameter satisfies a first condition associated with a first predetermined threshold value defined for the wing movement operation. The method 600 may also include, at (606), automatically initiating, with one or more of the controllers 102, 104, movement of the work vehicle relative to a surface 13 on which the work vehicle 14 is supported to assist the folding or unfolding of the wing assembly 20 during the performance of the wing movement operation when it is determined that the first wing movement parameter satisfies the first condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically actuating wing assemblies of an agricultural implement associated with a work vehicle, the method comprising:
monitoring, with one or more computing devices, a first wing movement parameter associated with folding or unfolding a wing assembly of the agricultural implement during the performance of a wing movement operation;
determining, with the one or more computing devices, whether the first wing movement parameter satisfies a first condition associated with a first predetermined threshold value defined for the wing movement operation; and
when it is determined that the first wing movement parameter satisfies the first condition, automatically initiating, with the one or more computing devices, movement of the work vehicle relative to a surface on which the work vehicle is supported to assist the folding or unfolding of the wing assembly during the performance of the wing movement operation,
wherein monitoring the first wing movement parameter comprises monitoring a wing speed of the wing assembly during the performance of the wing movement operation, and wherein the first condition is met when the monitored wing speed of the wing assembly is less than a minimum wing speed threshold.

2. The method of claim 1, wherein monitoring the first wing movement parameter comprises monitoring a load applied through a frame of the agricultural implement during the performance of the wing movement operation, and wherein the first condition is met when the monitored load exceeds a maximum load threshold.

3. The method of claim 2, wherein monitoring the first wing movement parameter comprises monitoring a force applied between the frame of the agricultural implement and an actuator configured to extend or retract with the folding or unfolding of the wing assembly.

4. The method of claim 1, wherein monitoring the first wing movement parameter comprises monitoring a fluid pressure associated with an actuator configured to extend or retract with the folding or unfolding of the wing assembly, and wherein the first condition is met when the monitored fluid pressure exceeds an actuator pressure threshold value.

5. The method of claim 1, further comprising, upon completion of the wing movement operation, automatically terminating, with the one or more computing devices, the movement of the work vehicle.

6. The method of claim 5, further comprising:
after completion of the wing movement operation, automatically sensing, with the one or more computing devices, an orientation angle of a caster wheel of the agricultural implement relative to a forward direction of the agricultural implement;
comparing, with the one or more computing devices, the orientation angle of the caster wheel with a predetermined angle range relative to the forward direction; and
if the orientation angle falls outside the predetermined angle range, reinitiating movement of the work vehicle movement relative to the surface to adjust the orientation angle of the caster wheel.

7. The method of claim 1, wherein the one or more computing devices comprise an implement controller provided in operative association with the agricultural implement, and wherein automatically initiating movement of the work vehicle comprises transmitting, with the implement controller, a speed control request instructing a vehicle controller of the work vehicle to initiate movement of the work vehicle.

8. A method for automatically actuating wing assemblies of an agricultural implement associated with a work vehicle, the method comprising:
monitoring, with one or more computing devices, a first wing movement parameter associated with folding or unfolding a wing assembly of the agricultural implement during the performance of a wing movement operation;
determining, with the one or more computing devices, whether the first wing movement parameter satisfies a first condition associated with a first predetermined threshold value defined for the wing movement operation;
when it is determined that the first wing movement parameter satisfies the first condition,
automatically initiating, with the one or more computing devices, movement of the work vehicle relative to a surface on which the work vehicle is supported to assist the folding or unfolding of the wing assembly during the performance of the wing movement operation, and
automatically reducing, with the one or more computing devices, a speed at which the work vehicle is being moved when it is determined that a second wing movement parameter satisfies a second condition associated with a second predetermined threshold value defined for the wing movement operation, the second wing movement parameter varying with the speed of the work vehicle during performance of the wing movement operation.

9. The method of claim 8, wherein the first wing movement parameter corresponds to the same parameter as the second wing movement parameter.

10. The method of claim 8, wherein monitoring the second wing movement parameter comprises monitoring at least one of a wing speed of the wing assembly during the performance of the wing movement operation, a frame load applied through the frame of the agricultural implement during the performance of the wing movement operation, or a hitch load between a hitch of the work vehicle and the frame of the agricultural implement.

11. A system for actuating wing assemblies associated with a work vehicle, the system comprising:
an agricultural implement including a frame and a wing assembly coupled to the frame, the wing assembly configured to be moved relative to the frame between an extended position and a transport position during the performance of a wing movement operation;
a wing movement sensor configured to detect a first wing movement parameter associated with movement of the wing assembly between the extended position and the transport position;
a vehicle controller configured to control movement of the work vehicle with respect to a surface on which the work vehicle is supported;
an implement controller communicatively coupled to the wing movement sensor and the vehicle controller, the implement controller including a processor and associated memory, the memory storing instructions that, when executed by the processor, configure the implement controller to:
monitor the first wing movement parameter based on signals received from the wing movement sensor;

determine whether the first wing movement parameter satisfies a first condition with respect to a first predetermined threshold value defined for the wing movement operation; and when it is determined that the first wing movement parameter satisfies the first condition, automatically transmit a vehicle movement request to the vehicle controller to cause the work vehicle to move relative to a surface on which the work vehicle is supported to assist moving the wing assembly between the extended and transport positions during the wing movement operation, wherein the wing movement sensor is configured to detect a wing speed of the wing assembly during the performance of the wing movement operation; and the implement controller is configured to monitor the wing speed, the first condition being met when the monitored wing speed of the wing assembly is less than the minimum wing speed threshold.

12. The system of claim 11, wherein:

the wing movement sensor is configured to detect a load applied through the frame of the agricultural implement during the performance of the wing movement operation; and the implement controller is configured to monitor the load based on signals received from the load sensor, the first condition being met when the monitored load exceeds the maximum load threshold.

13. The system of claim 11, further comprising an actuator configured to extend or retract with the movement of the wing assembly between the extended position and the transport position, the implement controller being configured to monitor a fluid pressure associated with the actuator, the first condition being met when the monitored fluid pressure exceeds an actuator pressure threshold value.

14. The system of claim 11, further comprising a hitch load sensor, the implement controller being configured to monitor a hitch load between the work vehicle and the frame of the agricultural implement during the performance of the wing movement operation based on signals received from the hitch load sensor, the first condition being met when the monitored hitch load exceeds a hitch load threshold value.

15. The system of claim 11, wherein the implement controller is configured to:

determine whether a second wing movement parameter satisfies a second condition with respect to a second predetermined threshold value; and automatically reduce a speed at which the work vehicle is being moved when it is determined that the second wing movement parameter satisfies the second condition associated with the second predetermined threshold value.

16. The system of claim 15, wherein the second wing movement parameter comprises at least one of a wing speed of the wing assembly, a load applied through the frame of the agricultural implement, or a hitch load between the work vehicle and the frame of the agricultural implement.

17. The system of claim 11, wherein the implement controller is configured to transmit a vehicle stop request to the vehicle controller to cause the vehicle to stop moving relative to the surface upon completion of the movement of the wing assembly between the extended position and the transport position.

18. The system of claim 11, wherein the first wing movement parameter is the same as a second wing movement parameter.

* * * * *